(12) United States Patent
Cailley et al.

(10) Patent No.: US 10,932,586 B2
(45) Date of Patent: Mar. 2, 2021

(54) STIFFNESS ADJUSTMENT DEVICE

(71) Applicant: TOURNADRE SA STANDARD GUM, Bourges (FR)

(72) Inventors: Géraud Cailley, Bourges (FR); Pascal Lobry, Bourges (FR); Jacques Lobry, Bourges (FR)

(73) Assignee: TOURNADRE SA STANDARD GUM, Bourges (FR)

( * ) Notice: Subject to any disclaimer, the term of this patent is extended or adjusted under 35 U.S.C. 154(b) by 0 days.

(21) Appl. No.: 15/978,396

(22) Filed: May 14, 2018

(65) Prior Publication Data

US 2018/0325275 A1 Nov. 15, 2018

(30) Foreign Application Priority Data

May 12, 2017 (FR) ...................................... 17 54174

(51) Int. Cl.
| | |
|---|---|
| *A47C 27/06* | (2006.01) |
| *A47C 7/35* | (2006.01) |
| *A47C 23/04* | (2006.01) |
| *F16F 1/04* | (2006.01) |
| *F16F 3/04* | (2006.01) |
| *A47C 23/00* | (2006.01) |

(Continued)

(52) U.S. Cl.
CPC ............ *A47C 27/061* (2013.01); *A47C 7/345* (2013.01); *A47C 7/35* (2013.01); *A47C 7/40* (2013.01); *A47C 23/002* (2013.01); *A47C 23/04* (2013.01); *A47C 23/0435* (2013.01); *A47C 23/067* (2013.01); *F16F 1/041* (2013.01); *F16F 1/3737* (2013.01); *F16F 3/04* (2013.01); *F16F 2226/04* (2013.01); *F16F 2228/066* (2013.01)

(58) Field of Classification Search
CPC ........ F16F 1/041; F16F 2228/066; F16F 3/04; F16F 1/3737; F16F 2223/04; A47C 7/342; A47C 7/345; A47C 23/0435; A47C 27/061; A47C 27/066; A47C 23/002; A47C 23/04; A47C 23/043; A47C 23/067
See application file for complete search history.

(56) References Cited

U.S. PATENT DOCUMENTS 2,323,286 A * 6/1943 Ward ...................... B29C 33/00
425/542
2,842,784 A 7/1958 Grund
(Continued)

FOREIGN PATENT DOCUMENTS

DE 20318252 U1 2/2005
DE 202005006399 U1 9/2006
(Continued)

*Primary Examiner* — Thomas J Williams
(74) *Attorney, Agent, or Firm* — The Webb Law Firm

(57) ABSTRACT

The invention relates to the field of furnishing. In particular, the invention relates to a stiffness adjustment device movable between an interference position for imposing a restriction on the deformation of a seat, back or bedding spring, and a non-interference position for releasing the spring from the restriction. The stiffness adjustment device comprises a resilient element, e.g. such as a flexible blade and, as it moves between the interference and non-interference positions it passes through an intermediate position in which the resilient element is subjected to resilient bending that is greater than in the interference and non-interference positions.

13 Claims, 11 Drawing Sheets

(51) Int. Cl.
*A47C 23/043* (2006.01)
*A47C 23/06* (2006.01)
*A47C 7/34* (2006.01)
*A47C 7/40* (2006.01)
*F16F 1/373* (2006.01)

(56) References Cited

U.S. PATENT DOCUMENTS

| | | | |
|---|---|---|---|
| 2,985,895 A | 5/1961 | Bloom | |
| 3,084,926 A * | 4/1963 | Lemelson | A63H 3/04 267/182 |
| 3,608,107 A | 9/1971 | Kentor et al. | |
| 4,222,137 A * | 9/1980 | Usami | A47C 23/0435 5/697 |
| 4,667,357 A | 5/1987 | Fortune | |
| 6,427,990 B1 | 8/2002 | Hartmann | |
| 6,684,435 B1 | 2/2004 | Wells | |
| 6,826,791 B2 | 12/2004 | Fromme | |
| 7,636,971 B2 | 12/2009 | DeMoss | |
| 7,805,790 B2 | 10/2010 | DeMoss | |
| 9,072,387 B2 * | 7/2015 | Lobry | A47C 23/067 |
| 9,468,306 B2 | 10/2016 | Lobry | |
| 2004/0123384 A1 | 7/2004 | Fromme | |
| 2008/0209644 A1 | 9/2008 | Wieland | |
| 2018/0325273 A1 * | 11/2018 | Cailley | A47C 23/002 |
| 2018/0325275 A1 | 11/2018 | Cailley et al. | |
| 2020/0196770 A1 * | 6/2020 | Cailley | A47C 27/061 |
| 2020/0205578 A1 * | 7/2020 | Cailley | A47C 7/345 |

FOREIGN PATENT DOCUMENTS

| | | | |
|---|---|---|---|
| DE | 102008050108 A1 | 4/2010 | |
| EP | 1155643 A2 | 11/2001 | |
| EP | 1386564 A1 | 2/2004 | |
| EP | 2526835 A1 | 11/2012 | |
| EP | 2803297 A1 | 11/2014 | |
| EP | 3087873 A1 | 11/2016 | |
| WO | 9627312 A1 | 9/1996 | |
| WO | WO-9627312 A1 * | 9/1996 | A47C 27/061 |
| WO | 2008015235 A1 | 2/2008 | |

* cited by examiner

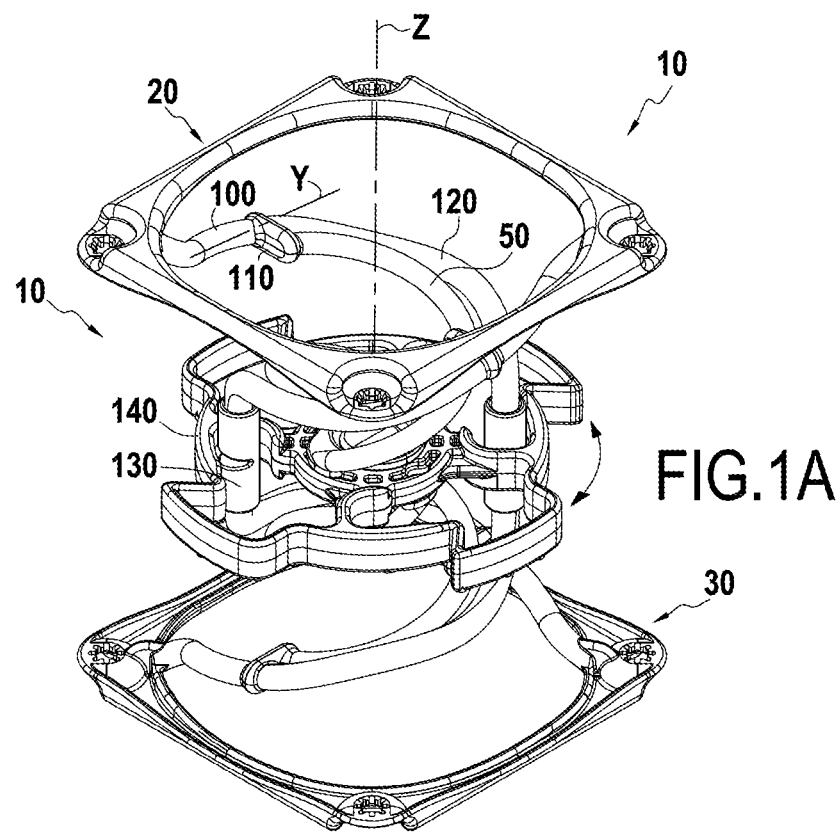
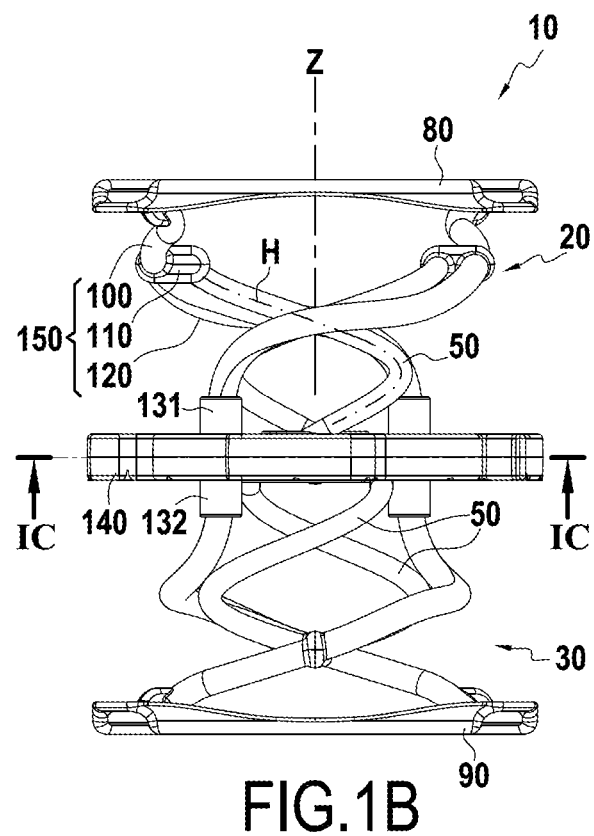

STIFFNESS ADJUSTMENT DEVICE

CROSS-REFERENCE TO RELATED APPLICATION

This application claims priority to French Patent Application No. 1754172 filed May 12, 2017, the disclosure of which is hereby incorporated in its entirety by reference.

BACKGROUND OF THE INVENTION

The present disclosure relates to the field of furnishing and more particularly to a stiffness adjustment device and method.

In order to make a seat, back, or bed surface adaptable to the preferences and to the anatomy of various different users, bedding assemblies, such as mattresses and spring boxes, have already been proposed that are adjustable in stiffness, e.g. in EP 1 386 564 A1, EP 1 155 643 A2, WO 2008/015235, WO 96/27312, U.S. Pat. No. 4,667,357, or DE 10 2008 050 108 A1. Typically, in order to adjust stiffness, those bedding assemblies include at least one device that is movable between at least a first position and a second position for imparting different stiffnesses.

Nevertheless, a problem that can be encountered in such stiffness adjustment devices is the problem of the devices moving in involuntarily and untimely manner that can lead to an unexpected change in stiffness. In order to prevent such involuntary movement of the adjustment device, proposals have been made by way of example in European patent EP 1 386 564 A1 for a ratchet device, or in U.S. Pat. No. 4,667,357 for guide slots. Nevertheless, those arrangements make stiffness adjustment devices more complicated to fabricate and actuate.

OBJECT AND SUMMARY OF THE INVENTION

The present disclosure seeks to remedy those drawbacks by proposing a stiffness adjustment device that is suitable for maintaining a selected stiffness for a seat, back, or bedding spring with means that are simple to implement and easy to operate.

In at least one example, the stiffness adjustment device, which may be movable between an interference position for imposing a restriction on the deformation of a bedding spring and a non-interference position for releasing the spring from the restriction by passing through an intermediate position between the interference and the non-interference positions, may then include a resilient element that is subjected in the intermediate position to resilient bending that is greater than in the interference and non-interference positions.

By means of these provisions, the resilient element opposes resilient resistance to movement of the device between the interference and non-interference positions, so as to hold the control element in stable manner in each of those positions, but without that preventing the device being actuated voluntarily in order to modify the stiffness of the bedding. The stiffness adjustment device may thus be bistable.

In particular, the resilient element may be a spring blade. The device may thus be made in a manner that is particularly simple. Furthermore, when not stressed, the spring blade may be curved. Thus, the resilient bending in the intermediate position may be contrary to the curvature of the unstressed resilient blade, and the relaxation of the spring blade towards its naturally curved configuration may provide a return force towards the interference and non-interference positions on either side of the intermediate position.

In order to restrict the overall size of the stiffness adjustment device, it may in particular comprise a rotary part suitable for turning between the interference and non-interference positions. This rotary part may in particular be suitable for turning about a compression axis of the spring between the interference and non-interference positions. Thus, the adjustment device can be integrated in the spring without necessarily enlarging its footprint in a support plane perpendicular to its compression axis. In order to facilitate production, in particular if it is produced out of organic polymer material, and in particular thermoplastic material, the rotary part may be molded, in particular injection molded. Nevertheless, other materials, e.g. metals, and/or other production methods, such as for example additive fabrication, may be used as an alternative or respectively to organic polymers and to molding.

In order to enable a plurality of springs to be adjusted simultaneously, the stiffness adjustment device may include not only one single rotary element but a plurality of rotary parts suitable for turning between interference and non-interference positions. Each rotary part may be configured to impose a restriction on the deformation of a corresponding spring in the interference position, and to release the corresponding spring from the restriction in the non-interference position.

The stiffness adjustment device may include a control member movable between the interference and non-interference positions. This control member may have a plurality of resilient elements subjected in the intermediate position to resilient bending that is greater than in the interference and non-interference positions. Each resilient element may be connected to a corresponding rotary part from among the plurality of rotary parts by a corresponding pivot. In particular, the control member may be movable in a straight line between the interference and non-interference positions, so as to enable it to be positioned between rows of bedding springs with respective rotary parts for adjusting their stiffness. In order to facilitate production of the control member, in particular if it is produced out of an organic polymer material, in particular a thermoplastic material, the control member may be molded, in particular injection molded, like the rotary element. Nevertheless, other materials, e.g. metals and/or other production methods, such as for example additive fabrication, may be used as an alternative or in addition respectively to organic polymers and to molding.

Alternatively, or in addition to the control member, each rotary part of the plurality of rotary parts includes at least one resilient element subjected in the intermediate position to resilient stress that is greater than in the interference and non-interference positions, and that is connected via a pivot to an adjacent rotary part among the plurality of rotary parts. Movements between the interference and non-interference positions can thus be transmitted between adjacent rotary parts in order to adjust the stiffness of all of the springs simultaneously.

Alternatively, or in addition to integrating the resilient element in a control member or a rotary part, the resilient element may be the spring itself, which can thus be subjected in the intermediate position of the stiffness adjustment device to resilient bending, e.g. perpendicularly to its compression axis, that is greater than in its interference and non-interference positions, so as to ensure that the stiffness adjustment device returns towards the interference position or the non-interference position on either side of the intermediate position.

The present disclosure also provides an assembly, for example a mattress or a bed box possibly including a seat, back, or bedding spring, and the above-mentioned adjustment device for adjusting the stiffness of the spring by moving between the interference and non-interference positions. In order to facilitate production of the spring, in particular if it is made out of organic polymer material, in particular thermoplastic material, the spring may also be molded, in particular injection molded. Nevertheless, other materials, e.g. metals, and/or other production methods, such as for example additive fabrication, may be used as an alternative or in addition respectively to organic polymers and to molding.

The present disclosure also relates to a method of adjusting stiffness with a stiffness adjustment device. The method of adjusting stiffness may comprise at least one step in which the stiffness adjustment device is moved between an interference position imposing a restriction on the deformation of a seat, back, or bedding spring, and a non-interference position releasing the spring from the restriction. In this movement, the stiffness adjustment device may pass through an intermediate position in which a resilient element of the stiffness adjustment device is subjected to resilient bending that is greater than in the interference and non-interference positions.

BRIEF DESCRIPTION OF THE DRAWINGS

The invention can be well understood and its advantages appear better on reading the following detailed description of embodiments given as non-limiting examples. The description refers to the accompanying drawings, in which:

FIG. 1A is a perspective view of a relaxed spring of adjustable stiffness, with its adjustment device in its position of greater stiffness;

FIG. 1B is a side view of the FIG. 1A spring;

DETAILED DESCRIPTION OF THE INVENTION

Figure 1C:
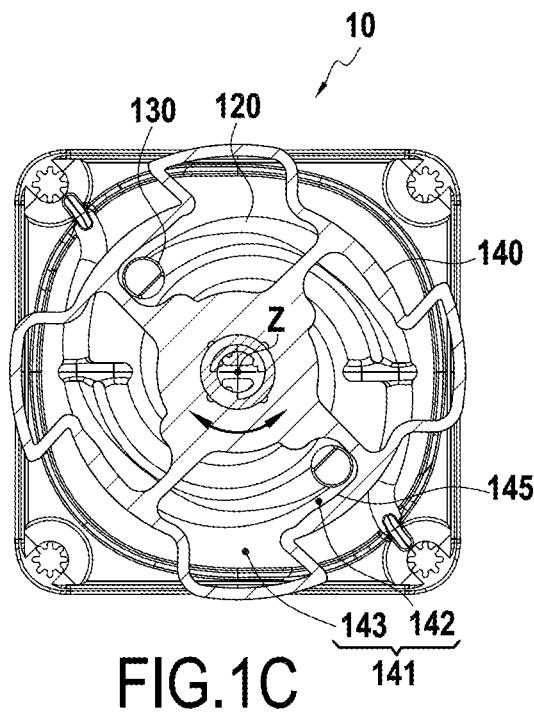
FIG. 1C is a section view of the FIG. 1B spring on plane IC-IC.

FIGS. 1A to 1C show a spring 10 for seats, backs, or bedding and of stiffness along a compression axis Z that is adjustable. As shown in the example shown, the spring 10 may comprise a plurality of resilient parts arranged in series along the compression axis Z. In particular, it may comprise a first resilient part 20 and a second resilient part 30 that are arranged mechanically in series along the compression axis Z and that are connected together by a connection 40 that may be situated in the center of the spring 10, as in the example shown.

Each of the two resilient parts 20 and 30 may comprise at least two helical elements 50 arranged mechanically in parallel, as in the example shown. In particular, as in the example shown in FIG. 1A, these helical elements 50 may be formed by rods wound in coaxial helices H around the compression axis Z. Furthermore, in each of the resilient parts 20, 30, the angular offset around the compression axis X between the coaxial helices of the helical elements 50 may be regular. Thus, in the example shown, the angular offset between the helical elements 50 of each resilient part 20, 30 may be 360°/x, where x is the number of helical elements 50 in parallel in each resilient part 20, 30. Thus, by way of example, for a number x of helical elements 50 equal to two, the angular offset may be 180°.

In the example shown, each resilient part 20, 30 may also include a connector 60, 70 that is complementary respectively to the connector 70, 60 of the other resilient part 30, 20 so as to form the connection 40, together with a support platform 80, 90. The connectors 60, 70 and the support platforms 80, 90 may be arranged on opposite ends of the respectively resilient parts 20, 30. Thus, when the resilient parts 20, 30 are assembled in series, by connecting together their respective connectors 60, 70 so as to form the spring 10 as in the example shown, the spring 10 may extend from one of the support platforms 80, 90 to the other along the compression axis Z.

In each resilient part 20, 30 of the example shown, one end of each helical element 50 may be connected directly to the respective connector 60, 70, while the other end may be connected to the support platforms 80, 90 via a respective resilient hinge 100. Each of the resilient hinges 100 may in particular present a twist axis Y that is substantially orthogonal to the compression axis Z and may be connected to the corresponding helical element 50 via a more rigid arm 110 that extends in a radial direction substantially orthogonal to the compression axis Z and to the corresponding twist axis Y so that the resilient hinge 100 is cantilevered out from the helical element 50 in a direction that is orthogonal to the compression axis Z. In the example shown, each resilient hinge 100 may be in the form of a torsion rod connecting the arm 110 to the support platforms 80, 90. Nevertheless, other forms can also be envisaged.

In addition, each resilient part 20, 30 in the example shown may also include other rods 120 that are secured to the arms 110. More specifically, each rod 120 may extend from a first end 121 that is secured to a corresponding arm 110 to a second end 122. Each second end 122 may be offset relative to the twist axis Y of the resilient hinge 100 corresponding to the arm 110 in a plane that is orthogonal to the twist axis Y so as to turn about the twist axis Y with the corresponding arm 110. In particular, between these first and second ends 121, 122, each rod 120 may be curved, and in particular may follow a helix that is greater than the helices of the helical elements 50 so as to extend around them so that the first and second ends 121, 122 of each rod 120 are situated on diametrically opposite sides of the helical elements 50, while also being mutually offset in a direction parallel to the compression axis Z. The rods 120 are also resiliently flexible.

Figure 2A:
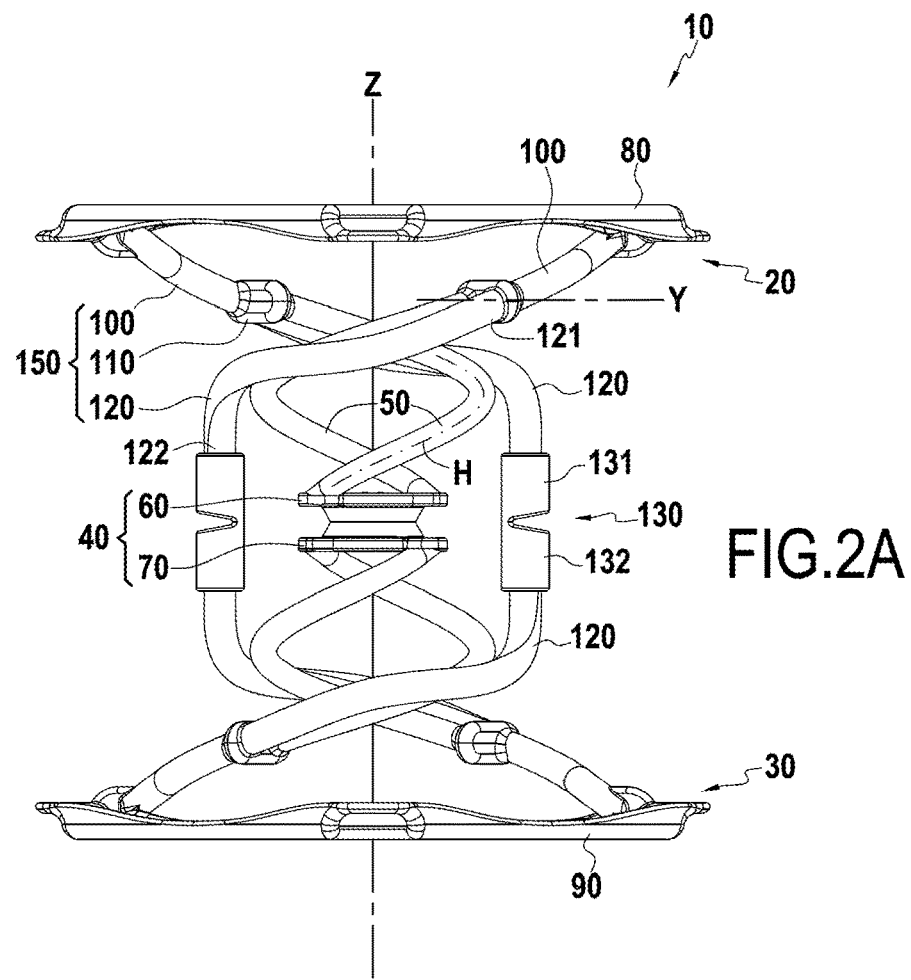
FIG. 2A is a side view of the FIG. 1A spring when relaxed, without its adjustment device.
Figure 2B:
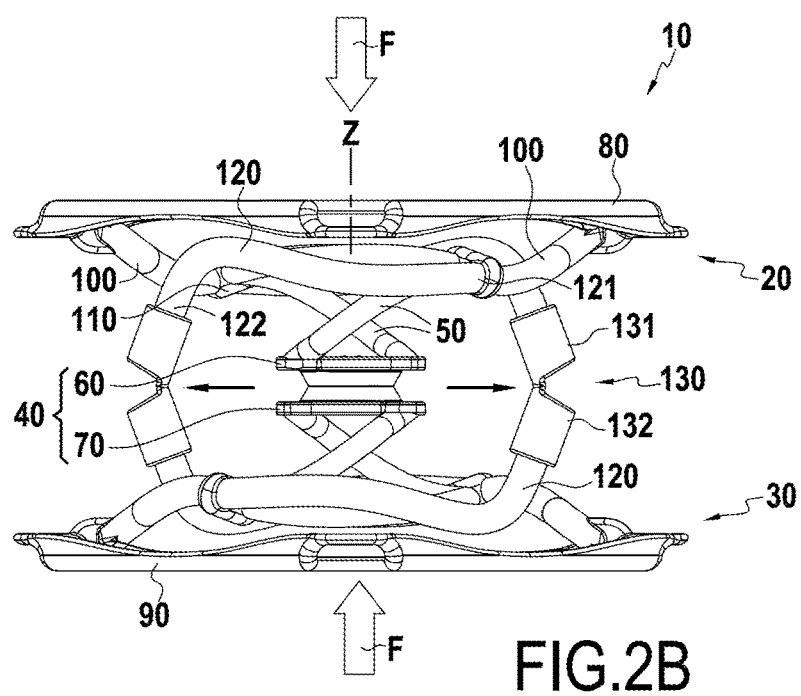
FIG. 2B is a side view of the FIG. 1A spring when compressed, without its adjustment device.

Thus, together with the corresponding arm 110 and rod 120, each resilient hinge 100 forms a mechanism 150 configured so that compressing the corresponding helical element 50 along the compression axis Z causes the second end of the rod 120 to move radially relative to the compression axis Z, as shown in FIG. 2B.

In the example shown, the second end 122 of each rod 120 of one of the resilient parts 20, 30 may be connected by a hinge to the second end 122 of an opposite rod 120 of the other resilient part 30, 20. More specifically, the corresponding second ends 122 of each pair of opposite rods 120 may be received in opposite endpieces 131, 132 of a flexible sleeve 130 that can thus form such a hinge. The flexible sleeves 130 may in particular be split perpendicularly to their main axes so as to increase their flexibility.

Figure 1D:
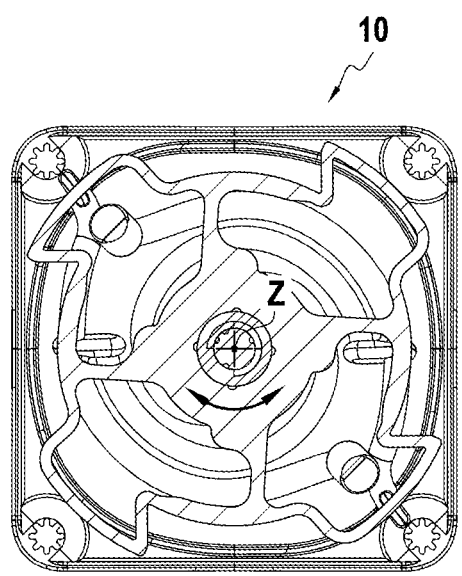
FIG. 1D is a section view of the FIG. 1C flexible element on the same plane, but with its adjustment device in its position of smaller stiffness.

An adjustment device can make it possible to adjust the stiffness of the spring 10 along the compression axis Z. This adjustment device may in particular comprise a rotary part 140 for each spring 10. This rotary part 140 may be held by the connectors 60, 70 so as to be turnable about the compression axis Z. As can be seen in particular in FIG. 1C, the rotary part 140 may have a plurality of openings 141 with the flexible sleeve 130 passing therethrough in a direction parallel to the compression axis Z. Each opening 141 may extend over a respective circular arc about the compression axis Z. More particularly, along this respective circular arc, each opening 141 may comprise a first section 142 and a second section 143, the first section 142 possibly being narrower than the second section 143 in the radial direction relative to the compression axis Z. More specifically, the outside edge 144 of each opening 141 may be closer to the compression axis Z in the first section 142 than in the second section 143, thereby forming a radial abutment 145 for restricting radial movement of the corresponding flexible sleeve 130 relative to the compression axis Z, and thus also restricting radial movement of the second ends 122 of the rods 120 engaged in the flexible sleeve 130. The rotary part 140 can thus turn between an interference position in which the flexible sleeves 130 are received in the first sections 142 of the openings 141 and the abutments 145 restrict radial outward movement of the flexible sleeve 130, and thus of the second ends 122 of the rods 120 relative to the compression axis Z, as shown in FIGS. 1A to 1C, and a non-interference position in which the flexible sleeves 130 are received in the larger second sections 143 of the openings 141, as shown in FIG. 1D, thereby leaving free the flexible sleeve 130 and the second ends 122 of the rods 120, so as to enable them to move radially further away from the compression axis Z, as shown in FIG. 2B.

The resilient parts 20, 30, the rotary part 140, and the flexible sleeves 130 may be made of organic polymer material, in particular of a thermoplastic material such as, for example: a polyamide, a polyoxymethylene, or a copolyester. Nevertheless, other materials, e.g. metallic materials, could be used alternatively or in combination with such polymer materials. The resilient parts 20, 30 and the rotary part 140 may in particular be molded, specifically injection molded. The flexible sleeves 130 may in particular be cut from an extruded part. Nevertheless, other materials, e.g. metals, and alternative production methods, such as for example additive fabrication, may be used as an alternative or in addition respectively to organic polymers and to molding or extrusion.

The operation of the spring 10 of the example shown can thus be described with reference to FIGS. 1A to 2B. When the rotary part 140 of the adjustment device 400 is in its non-interference position, with the flexible sleeves 130 received in the larger second sections 143 of the openings 141, and the bedding spring 10 is subjected to a compression force F along the compression axis Z between the support platforms 80, 90, the helical elements 50 are compressed and the arms 110 connecting them to the resilient hinges 100 turn about the respective twist axes Y together with the rods 120. As a result of the rods 120 turning about the respective twist axes Y, the second ends 122 of the rods 120 can move radially away from the compression axis Z without opposition over the width of the second sections 143 of the openings 141 of the rotary part 140, as shown in FIG. 2B. The spring 10 thus remains relatively flexible in compression.

Nevertheless, if the rotary part 140 is turned about the compression axis Z towards its interference position in such a manner that the flexible sleeves 130 are received in the narrower first sections 142 of the openings 141, the abutments 145 can restrict outward radial movement relative to the compression axis Z of the flexible sleeves 130 and thus of the second ends 122 of the rods 120, thereby restricting turning of the rods 120 about the respective twist axes Y of the corresponding resilient hinges 100 when the spring 10 is subjected to compression F along the compression axis Z. Even though the rods 120 may be resiliently flexible so as to enable them to return to the initial relaxed position when the compression F ceases, restricting them by means of the abutments 145 serves indirectly also to restrict the turning of the arms 110 about the respective twist axes Y, thereby stiffening the resilient hinges 100 and possibly also the helical elements 50, since twisting about their respective helices H can thus also be restricted indirectly. In this way, the springs 10 can thus present stiffness along the compression Z that is significantly greater when the rotary part 140 is in its interference position than when the rotary part 140 is in its non-interference position.

In order to form a unit such as a mattress or a box spring, it is possible to group together a plurality of springs of the kind described above. Thus, FIGS. 3A, 3B, 4A, 4B, 5A, and 5B show the core of a mattress 200 on a bed 300. The core of the mattress 200 may have a plurality of springs 10 arranged in the example shown as a plurality of rows and columns in a plane perpendicular to the compression axes Z. The support platforms 80, 90 of adjacent springs 10 may be connected together by flexible connections 210.

Figure 3A:
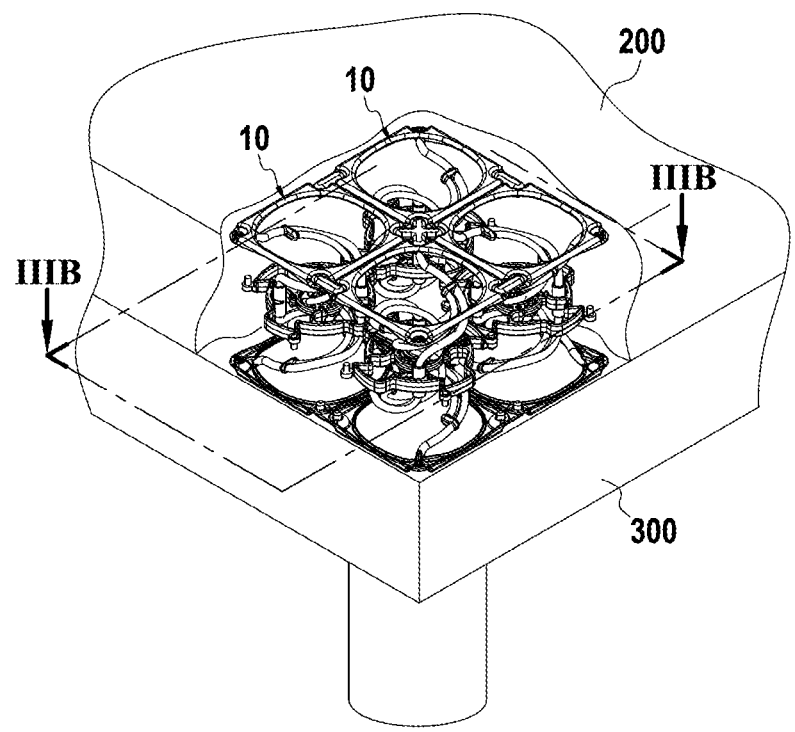
FIG. 3A is a perspective view of a unit comprising a plurality of springs analogous to the element of FIG. 1A, in the position of greater stiffness.
Figure 3B:
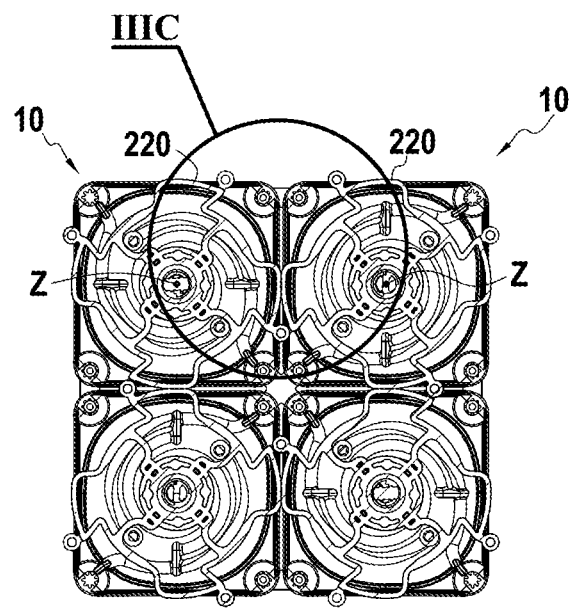
FIG. 3B is a section view of the FIG. 3A unit on plane IIIB-IIIB.
Figure 3C:
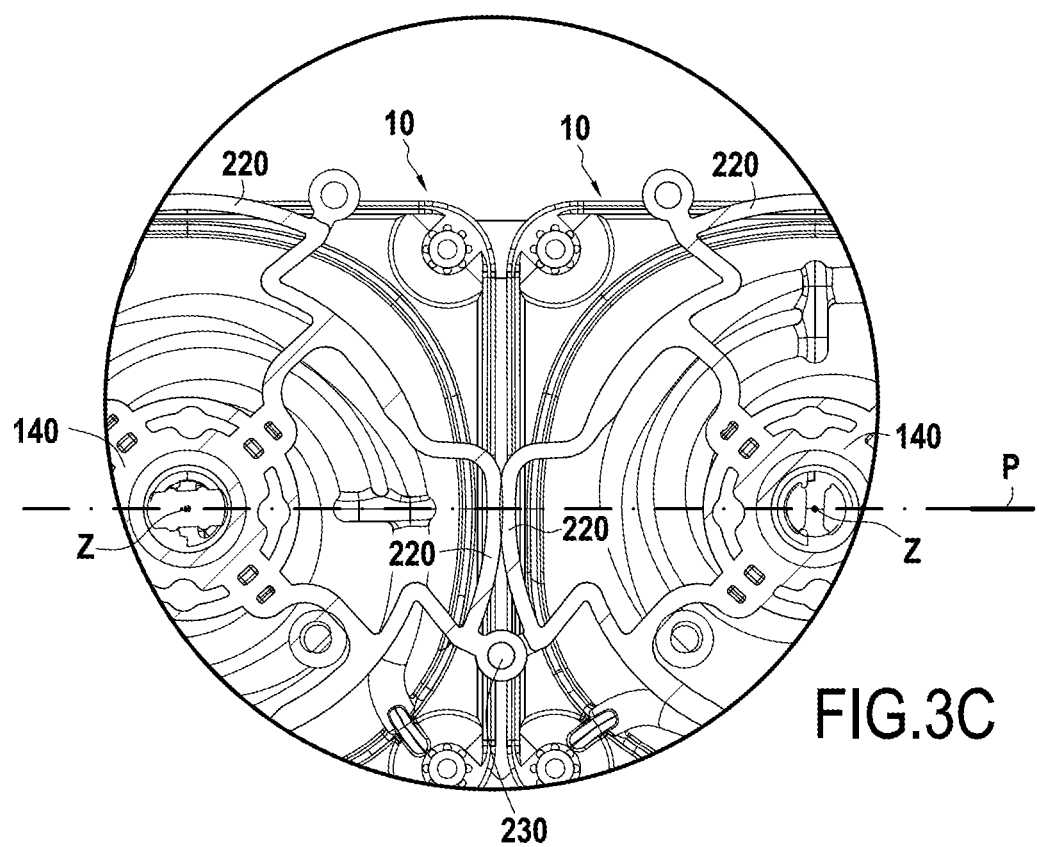
FIG. 3C is a detail of FIG. 3B.
Figure 4C:
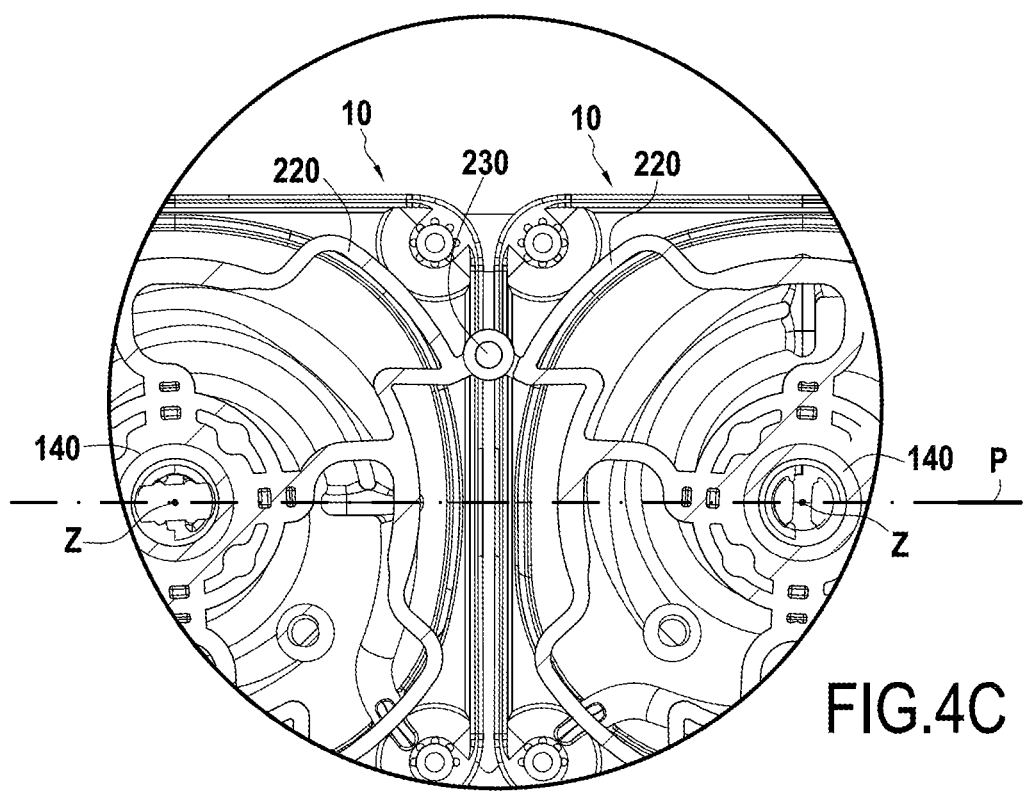
FIG. 4C is a detail of FIG. 4B.
Figure 4A:
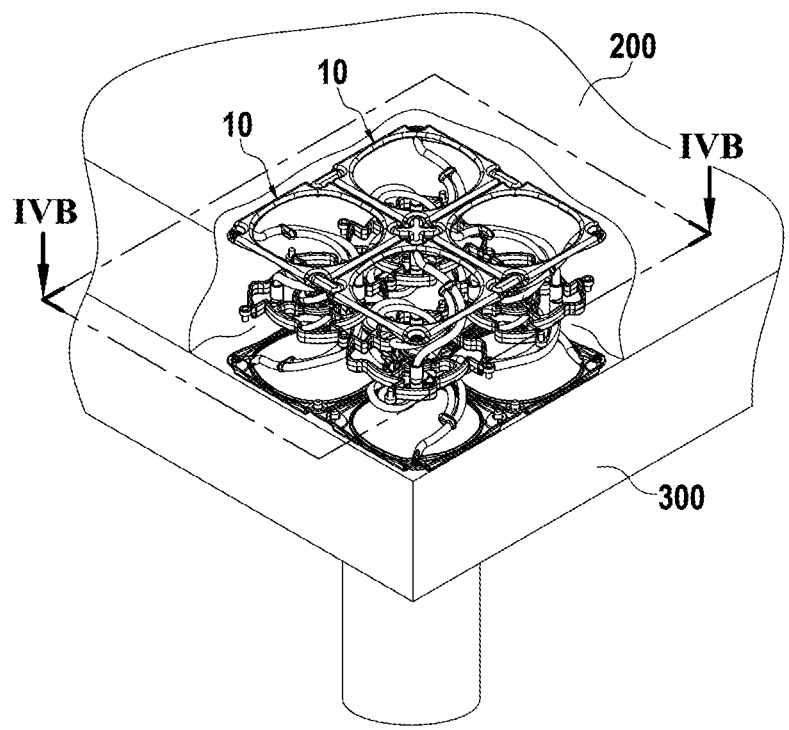
FIG. 4A is a perspective view of the FIG. 3A unit in its position of smaller stiffness.
Figure 4B:
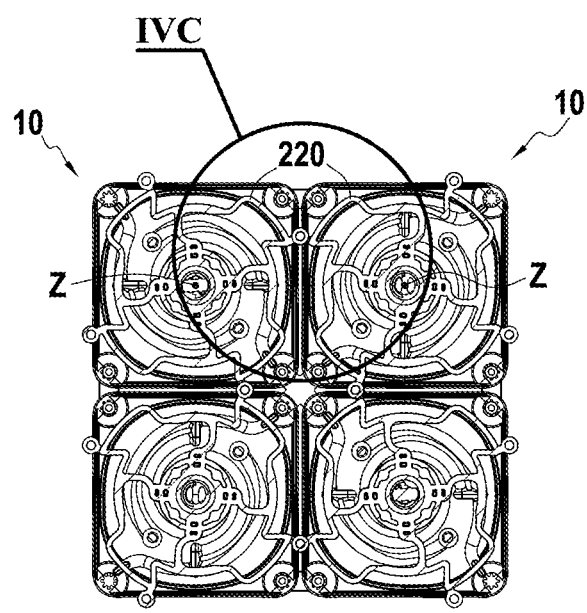
FIG. 4B is a section view of the FIG. 4A unit on plane IVB-IVB.
Figure 5A:
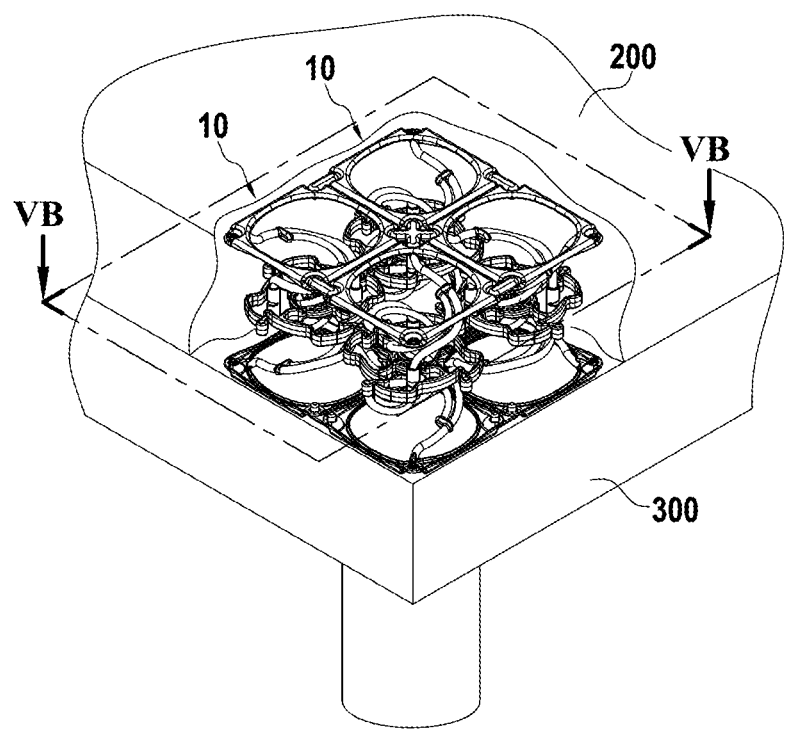
FIG. 5A is a perspective view of the FIG. 3A unit in an intermediate position.
Figure 5B:
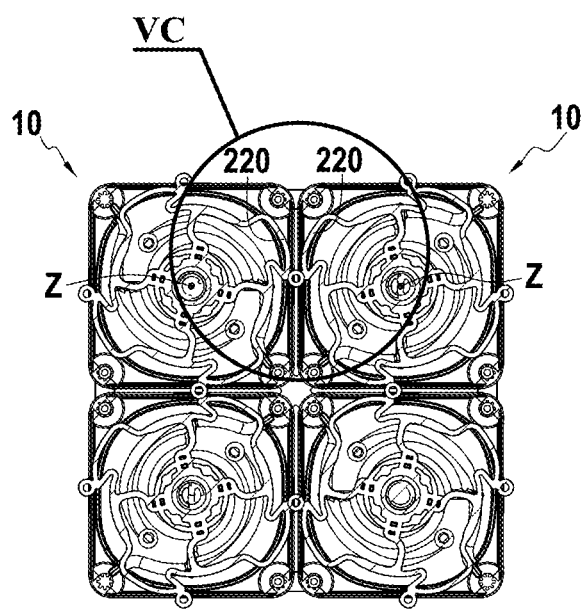
FIG. 5B is a section view of the FIG. 5A unit on plane VB-VB.
Figure 5C:
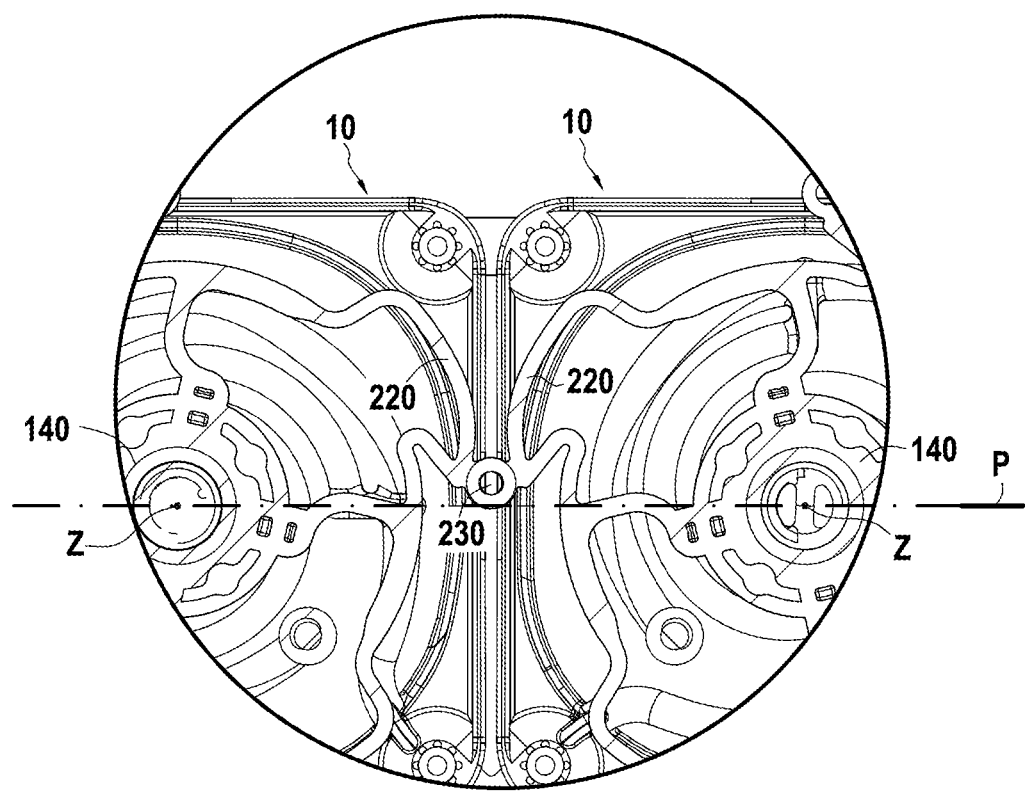
FIG. 5C is a detail of FIG. 5B.

In order to enable the rotary parts 140 of all of the springs 10 to be actuated simultaneously so as to move them between the interference and non-interference positions, the adjustment device may couple these rotary parts 140 together mechanically. More specifically, as shown in detail in FIGS. 3C, 4C, and 5C and by way of example, the adjustment device may comprise pivots 230 and at least one resilient element, which may be formed by a flexible blade 220 incorporated at the periphery of each rotary part 140, extending in a plane perpendicular to the compression axis Z, and curved radially outwards relative to the compression axis Z. Each pivot 230 may present a pivot axis parallel to the compression axes Z of the springs 10, and may couple together mechanically two flexible blades 220 situated on rotary parts 140 associated with a pair of adjacent springs 10. The distance between each pivot 230 and the compression axes Z of each of the two adjacent springs 10 may be greater than half the distance between the compression axes Z of the two adjacent springs 10 so that in the interference position, the pivot 230 is on one side of a flat plane P connecting together the compression axes Z of the two adjacent elements 10, as shown in FIG. 3C, in the non-interference position the pivot 230 is on the other side of the plane P, as shown in FIG. 4C, and in order to move the rotary parts 140 of the adjacent bedding elements 10 between the interference position and the non-interference position, the pivot 230 needs to pass through an intermediate position in the plane P in which the flexible blades 220 are resiliently bent against their respective curvatures towards the compression axes Z of their respective springs 10, as shown in FIG. 5C.

Thus, the bending of the flexible blades 220 makes it possible to deliver return forces respectively towards the interference and non-interference positions on either side of the intermediate position, thereby holding the interference and non-interference positions in stable manner and avoiding involuntary passage between them, and thus avoiding any involuntary change in the stiffness of the springs 10. The user needs to make a conscious effort in order to bend the flexible blades 220 so as to pass through the intermediate position and move the bistable device between its stable interference and non-interference positions.

Figure 6A:
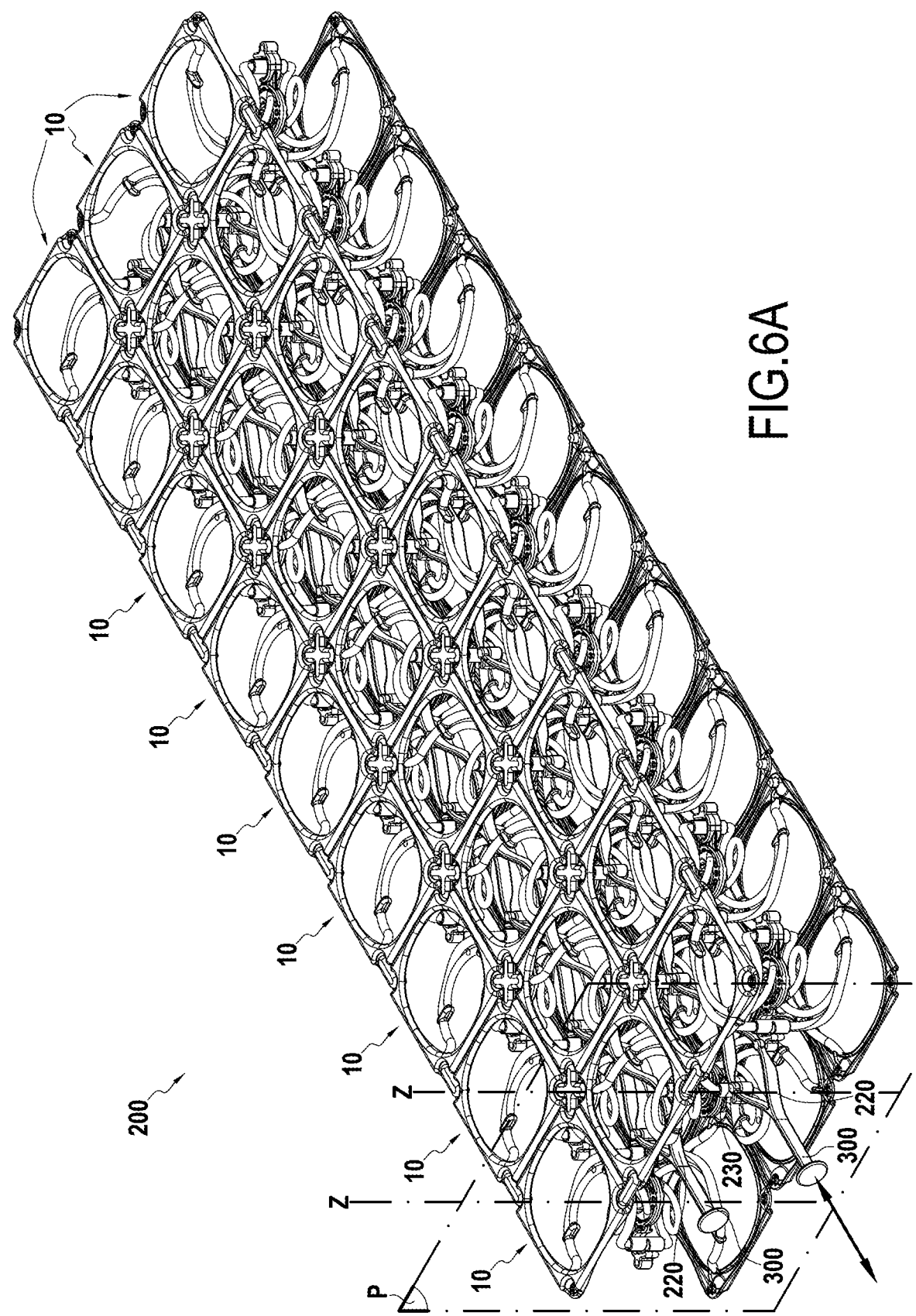
FIG. 6A is a perspective view of an alternative unit, likewise comprising a plurality of springs of adjustment stiffness, in the position of greater stiffness.
Figure 6B:
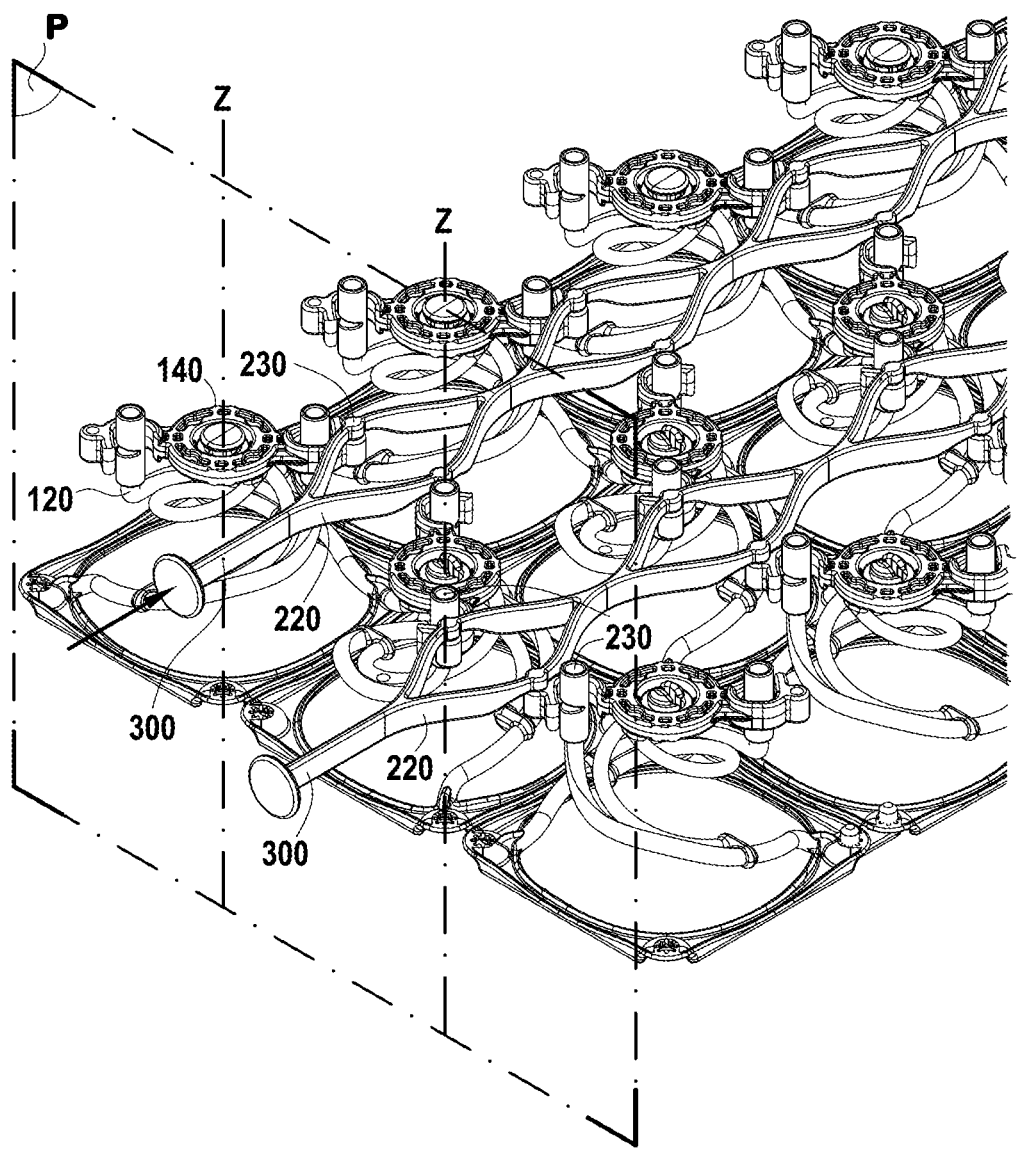
FIG. 6B is a perspective view of the FIG. 5A unit cut away on a plane VB-VB.
Figure 6C:
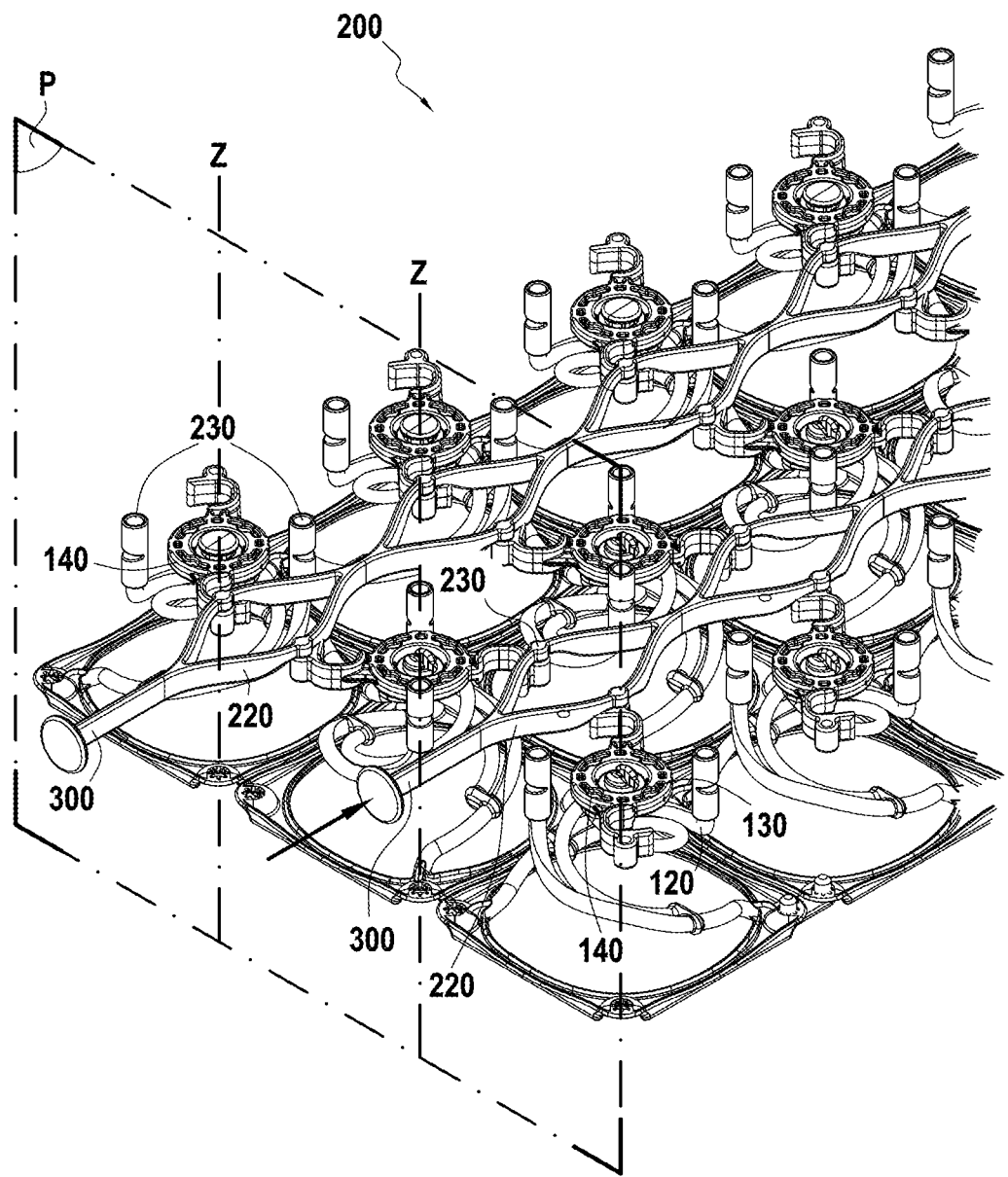
FIG. 6C is a perspective view of a FIG. 5A unit cut away on a plane VB-VB, in its position of smaller stiffness.

An alternative embodiment is shown in FIGS. 6A to 6C. In this alternative embodiment, the springs 10 and the stiffness adjustment device are similar to those of the first embodiment, and components that are analogous are consequently given the same reference numerals in the drawings. The rotary parts 140 in this second embodiment may be simpler than in the first embodiment merely having radial arms 146 carrying radial abutments 145 at their respective ends, but, as in the first embodiment, each rotary part 140 can turn between the interference position in which these radial abutments 145 restrict radial outward movement relative to the compression axis Z of the flexible sleeves 130 and thus also of the second ends 122 of the rods 120 engaged in the flexible sleeves 130, and the non-interference position in which the rotary part 140 no longer restricts this radial outward movement.

In addition, in this alternative embodiment, the pivots 230 need not connect the rotary parts 140 directly to adjacent rotary parts 140, but may connect them rather to control members 300 that may be arranged between the rows of springs 10 and that can move in a straight line between the interference and non-interference positions of the adjustment device 400. The resilient elements in the form of flexible blades 220 may be integrated in the control members 300 so that the control members 300 of the adjustment member pass through an intermediate position between the interference and non-interference positions in which the flexible blades 220 are resiliently stressed against their respective curvatures, by the pivots 230 moving perpendicularly to the movement of the control members 300 when they turn about the compression axes Z of the respective springs 10.

Nevertheless, the principle of resilient bending in the intermediate position for ensuring return towards one or the other of the interference and non-interference positions can even be applied without using such curved flexible blades. Specifically, the springs 10 may present resilience in bending perpendicularly to their compression axes Z so as to enable the rotary parts 140 when in their intermediate positions to move resiliently sideways between the first and second positions. Under such circumstances, the springs 10 could themselves constitute the flexible elements of resilience perpendicularly to their compression axes Z that serves to deliver the return forces towards the interference and non-interference positions on either side of the intermediate position.

Although the present invention is described with reference to specific embodiments, it is clear that various modifications and changes may be undertaken on those embodiments without going beyond the general ambit of the invention as defined by the claims. Furthermore, individual characteristics of the various examples and embodiments mentioned may be combined in additional embodiments. Consequently, the description and the drawings should be considered in a sense that is illustrative rather than restrictive.

The invention claimed is:

1. A stiffness adjustment device movable between an interference position for imposing a restriction on the deformation of a plurality of springs of a seat, of a seatback, or of bedding, and a non-interference position for releasing the plurality of springs from the restriction, by passing through an intermediate position between the interference and the non-interference positions, and including a resilient element subjected in the intermediate position to resilient bending that is greater than in the interference and non-interference positions and a plurality of rotary parts suitable for turning between interference and non-interference positions, each rotary part being configured to impose a restriction on the deformation of a corresponding spring of the plurality of springs in the interference position, and to release the corresponding spring from the restriction in the non-interference position.

2. The stiffness adjustment device according to claim 1, wherein the resilient element is a spring blade.

3. The stiffness adjustment device according to claim 2, wherein the spring blade, when not stressed, is curved.

4. The stiffness adjustment device according to claim 1, wherein each rotary part is suitable for turning about a compression axis of the corresponding spring between the interference and non-interference positions.

5. The stiffness adjustment device according to claim 1, wherein each rotary part is injection molded.

6. A seat, back, or bed assembly including a plurality of springs of a seat, back, or bedding spring and a stiffness adjustment device according to claim 1 in order to adjust the stiffness of the plurality of springs by moving between the interference and non-interference positions.

7. The assembly according to claim 6, wherein the at least one spring of the plurality of springs is injection molded.

8. The stiffness adjustment device according to claim 1, including a control member movable between the interference and non-interference positions, the control member having a plurality of resilient elements subjected in the intermediate position to resilient bending that is greater than in the interference and non-interference positions, each resilient element being connected to a corresponding rotary part from among the plurality of rotary parts by a corresponding pivot.

9. The stiffness adjustment device according to claim 8, wherein the control member is movable in a straight line between the interference and non-interference positions.

10. The stiffness adjustment device according to claim 8, wherein the control member is injection molded.

11. The stiffness adjustment device according to claim 1, wherein each rotary part of the plurality of rotary parts includes at least one resilient element subjected in the intermediate position to resilient stress that is greater than in the interference and non-interference positions, and that is connected via a pivot to an adjacent rotary part among the plurality of rotary parts.

12. The stiffness adjustment device according to claim 1, wherein the resilient element is a spring.

13. A method of adjusting stiffness of a plurality of springs of a seat, of a seatback, or of bedding, with a stiffness adjustment device including a plurality of rotary parts, the method comprising at least a step in which each rotary part of the plurality of rotary parts of the stiffness adjustment device is turned between an interference position imposing a restriction on the deformation of the corresponding spring of the plurality of springs and a non-interference position releasing the corresponding spring from the restriction by passing through an intermediate position in which a resilient element of the stiffness adjustment device is subjected to resilient bending that is greater than in the interference and non-interference positions.

* * * * *